2,919,281
PROCESS FOR THE PREPARATION OF ACETYLENIC ALCOHOLS

Saul Chodroff, Brooklyn, and Morris Dunkel, Kew Gardens, N.Y., assignors to Norda Essential Oil and Chemical Company, New York, N.Y., a corporation of New York No Drawing. Application July 23, 1958
Serial No. 750,297

5 Claims. (Cl. 260—340.5)

This invention relates to a process for the preparation of acetylenic alcohols by the reaction of acetylene with a carbonyl compound using potassium hydroxide as a catalyst in the presence of a low molecular weight aliphatic amide.

Acetylenic alcohols and glycols are prepared by the condensation of aromatic, aliphatic and alicyclic carbonyl compounds with acetylene in the presence of a base as the catalyst. The acetylenic alcohols and glycols are useful as hypnotics, as flavor and perfume constituents, and as reactive intermediates in organic synthesis, making use of the ethynyl group, the hydroxyl group, the propargyl group, and/or the allylic group formed upon semihydrogenation.

Classically, sodium or sodamide in liquid ammonia are used to effect the condensation of the carbonyl compound with acetylene in the laboratory. A typical sodium preparation is given by Newman, Fones and Booth, Journal of the American Chemical Society 67, 1053–1054 (1945), and Jones and McCombie, Journal of the Chemical Society, 1942, 733 describe a preparation using sodamide. The reaction has also been catalyzed by potassium dissolved in tertiary butyl alcohol as described by Schine, Ruzicka, Seidel and Tavel, Helvetical Chimica Acta 30, 1810 (1947), by sodamide in ether (Organic Synthesis, collective volume 3, 320 (1955)) and by potassium hydroxide dispersed in a variety of solvents such as methanol and acetaldehyde dibutyl acetal (Bergmann, Salybacher and Herman, J. Appl. Chem. 3, 39 (1953), Smith U.S. Patent No. 2,385,547, patented September 25, 1945, and Moulin, Helvetica Chimica Acta 34, 2416 (1951).

All of the above procedures, with the exception of that described by Smith, are practical only on a laboratory scale. Smith's procedure employs a large excess (550 mole percent of aqueous potassium hydroxide dispersed in a mixture of a high boiling inert organic solvent, such as an aromatic or aliphatic hydrocarbon or a monoether, and n-butanol. The inert organic solvent serves as a diluent or vehicle, helping to reduce the viscosity, and it also serves as a means for removing water from aqueous solutions of potassium hydroxide. Smith's process, however, requires high ratios of potassium hydroxide to carbonyl compound, because at lower ratios there is formed a viscous, gelatinous mass. Even at the ratios Smith uses, the reaction medium is difficult to stir. Vigorous agitation of the Smith reaction mixture is required, and high yields are not obtainable.

In accordance with the instant invention, a low molecular weight aliphatic amide having up to sixteen carbon atoms is incorporated in the condensation system composed of the carbonyl compound, acetylene, inert organic solvent and monohydric alcohol. A fluid, easily stirred reaction medium thereby is obtained. High yields result from conversions in the reaction media of the invention, due no doubt at least in part to the increased fluidity of the medium, but also apparently due to solvation or other effects attributable to the amide. The amide, since it is a polar solvent, increases the dielectric constant of the medium, and it also solubilizes the potassium metalloorganic complex formed. A more favorable ratio of potassium hydroxide to carbonyl compound within the range from 100 to 500 mole percent, can then be used. Only a small amount of the amide is needed to obtain this beneficial action.

The low molecular weight amide can be defined by the structure:

$$RCONR_1R_2$$

R, $R_1$ and $R_2$ are selected from the group consisting of hydrogen and lower alkyl radicals having from one to five carbon atoms, preferably from one to three carbon atoms. RCO is derived from an aliphatic carboxylic acid. Typical R, $R_1$ and $R_2$ radicals in addition to hydrogen are methyl, ethyl, propyl, isopropyl, butyl, and amyl. When R, $R_1$ and $R_2$ are hydrogen, the compound is formamide. Also exemplary are dimethyl acetamide and dimethyl formamide. The latter compound gives particularly good results, and is preferred.

The process of the invention is applicable to any carbonyl compounds which do not tend to undergo side reactions in the alkaline reaction medium. Aliphatic ketones and aldehydes such as methyl heptenone, methyl amyl ketone, methyl hexyl acetone, methyl hexyl ketone, butyraldehyde, hexaldehyde, heptaldehyde, geranyl acetone and 2-ethyl-hexaldehyde are exemplary. The process also is applicable to alicyclic carbonyl compounds such as menthone and aromatic carbonyl compounds such as p-tolylaldehyde, as well as heterocyclic compounds such as piperonal.

Any monohydric alcohol can be utilized in the reaction medium. Those having from three to eleven carbon atoms are preferred. Typical alcohols are methanol, 1-propanol, 1-butanol, 2-butanol, methylallyl alcohol, 1-pentanol, isoamyl alcohol, 4-methyl-2-pentanol, 1-octanol, 2-octanol, undecanol, cyclohexanol, tetrahydrofurfuryl alcohol, 2-phenyl ethyl alcohol, 3-phenyl propyl alcohol, phenol and tertiary butyl alcohol. The proportion of alcohol utilized can very widely, but usually the alcohol will constitute from about 2 to about 35% of the reaction medium.

The inert organic liquid can be any organic liquid which is substantially water-insoluble and inert both to the reactant and to the reaction products. The inert liquid preferably should have a boiling point of at least about 100° C., since the medium is heated to this temperature to dissolve the potassium hydroxide in the alcohol. The amount is not critical, and will be sufficient to give a fairly fluid reaction medium which can be adequately stirred without difficulty so that any material insoluble in the medium can be held in suspension.

Typical inert organic liquids include aromatic hydrocarbons such as xylene, tetralin, decalin, and ethyl benzene, aliphatic hydrocarbons such as naphtha, kerosene, decane, and octane, and aliphatic and aromatic monoethers such as diphenyl ether, dibutyl ether, diamyl ether and dihexyl ether.

The source of the acetylenic group would normally be acetylene, but acetylenic compounds such as propyne, 1-pentyne and phenylacetylene can also be used.

The amount of the lower molecular weight amide can be very small. An amount as low as 0.5% will give a considerable improvement. Usually the amount from the amide will not be in excess of 10%, but amounts as great as 25% have been used without disadvantage.

Because the potassium metallo-organic complex is soluble in the reaction medium of the invention, it is possible to use solid potassium hydroxide. This avoids the necessity of removing water when aqueous potassium hydroxide solutions are used. The amount of potassium hydroxide is based on the amount of carbonyl compound. Usually, at least one mole of potassium hydroxide is used for each mole of carbonyl compound. Best results are obtained when the amount of potassium hydroxide ranges from two to four moles per mole of carbonyl compound. Amounts as great as five moles do no harm, but more than this would be wasteful and unnecessary.

The reaction medium is readily prepared by suspending the potassium hydroxide in a mixture of the alcohol and inert organic liquid, and heating, desirably under reflux, at least to 100° C., with agitation until solution occurs. The state of physical subdivision of the potassium hydroxide is not critical; the potassium hydroxide can be in flake form or it can be pulverized to expedite solution. This requires from ten minutes to one hour. Then the mixture is cooled to a temperature below 35° C., whereupon it separates into two phases, and the amide is added. The amide is added in the cold to avoid hydrolysis thereof in the medium.

Reaction temperatures ranging from slightly above the freezing point of the mixture to about 35° C. are satisfactory. When the reaction medium has been brought to the desired reaction temperature, the alkyne, such as acetylene, is slowly introduced, until it is no longer absorbed by the mixture. The carbonyl compound then is added thereto slowly, over a period of about a half-hour to one hour, in an amount approximately equal to the number of moles of alkyne, as a result of which the potassium derivative of the corresponding acetylenic alcohol is formed. Reaction is complete in from fifteen to thirty minutes after all of the carbonyl compound has been added. The reaction medium is stirred throughout, to ensure uniform dispersion of the two-phase system. As reaction proceeds the reaction product dissolves and the reaction is complete when complete solution takes place.

When reaction is complete, water is added to the mixture to hydrolyze the potassium metallo-organic complex. The organic solvent layer is separated, neutralized, generally by bubbling carbon dioxide thereinto, and dried. The solvents are removed by distillation, and the crude product recovered by distillation under vacuum.

The following examples are illustrative:

*Example 1*

A mixture of 144 g. of potassium hydroxide (2.6 moles), 430 ml. of dry toluene and 32 ml. of redistilled n-butanol was heated to 100° C., without stirring. Vigorous agitation was then started and the materials were refluxed for one-half hour. The solution was chilled to —10° C., and 40 ml. of dimethyl formamide was added. Dry acetylene was passed in to saturate the system, and continued to be bubbled in continuously while 123 g. (0.9 mole) of methyl heptenone was added in the course of one hour. The flow of gas and agitation were continued for an additional fifteen minutes. The reaction was quenched by the rapid addition of 500 ml. of ice water. The organic solvent upper layer was separated, treated with carbon dioxide and dried. After removal of the solvent, 111 g. of the residue was collected at 90–95° C. at 18 mm. (75% of theory), $n_D^{20}$ 1.4630.

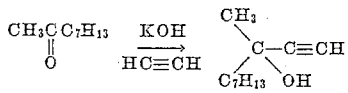

The above yield is to be compared with the following obtained in accordance with the procedure of the prior art without the dimethyl formamide.

A mixture of 1500 ml. of dry toluene, 126 ml. of redistilled n-butanol, and 340 g. of potassium hydroxide (6 moles) was heated to 100° C. without stirring. Vigorous agitation was then started and the materials were refluxed for one-half hour. The solution was chilled to —10° C. and dry acetylene was passed in to saturate the system, and continued to be bubbled in continuously while 289 g. (2 moles) of methyl heptenone was added in the course of one hour. The flow of gas and agitation were continued for an additional fifteen minutes. Pronounced gelling of the reaction mixture occurred as the reaction proceeded and was not affected by the continued flow of gas and agitation after all of the methyl heptenone had been added. The reaction was quenched by the rapid addition of 550 ml. of ice water. The upper solvent layer was saturated, treated with carbon dioxide and dried. After removal of the solvent 82 g. of the residue was collected at 90 to 95° C. at 18 mm. (36% of theory), $n_D^{20}$ 1.4630.

Thus the process of the invention gives a yield approximately two and one-half times that obtainable by the process of the prior art without the dimethyl formamide.

*Example 2*

A dispersion prepared from 558 ml. of xylene, 42 ml. of n-butanol and 187 g. (3.3 moles) of potassium hydroxide was chilled with stirring to —10° C. To this was added 50 ml. of dimethyl formamide. This chilled mixture was saturated with acetylene, and 74.2 g. (0.65 mole) of redistilled methyl amyl ketone was added slowly over one hour while acetylene was passed in simultaneously. The addition of acetylene and agitation was continued at this temperature for an additional fifteen minutes. The organic solvent upper layer was separated, treated with carbon dioxide, dried and distilled. The acetylenic alcohol was distilled at 101–103° C. at 47 mm., and weighed 51 g. (56% yield), $n_D^{23}$ 1.4382.

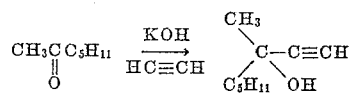

*Example 3*

A dispersion prepared from 558 ml. of toluene, 42 ml. of n-butanol and 187 g. (3.3 moles) of potassium hydroxide was chilled to —10° C. To this was added 50 ml. of dimethyl formamide. This chilled mixture was saturated with dry acetylene, and 163 g. (1.3 moles) of redistilled methyl hexyl ketone was added in one hour with agitation, chilling and a continuous flow of acetylene. After stirring an additional fifteen minutes, 300 ml. of water was added. The organic solvent layer was separated, neutralized with $CO_2$ and dried. Distillation yielded 107 g. (50% of theory) of alcohol, boiling at 97–99° C. at 20 mm., $n_D^{21}$ 1.4402.

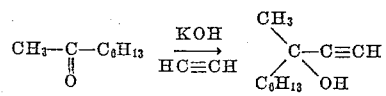

*Example 4*

A dispersion of 144 g. (2.6 moles) of potassium hydroxide was made with 430 ml. of dry toluene and 32 ml. of n-butanol. This was chilled to +10° C., and 40 ml. of dimethyl formamide was added. The solution was saturated with acetylene, and 190 g. (1.1 moles) of geranyl acetone added over one hour while continuously bubbling in acetylene. After adding 350 ml. of water, separating the organic layer, neutralizing with $CO_2$ and distilling the solvent, there was obtained 185 g. of dehydronerolidol, boiling at 108–110° C. at 1.0 mm. (86% of theory), $n_D^{21}$ 1.4778.

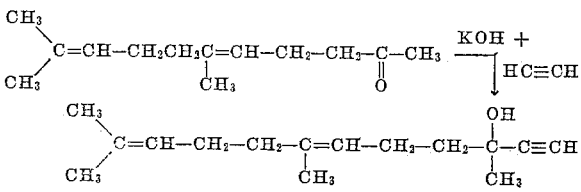

*Example 5*

To a chilled (—10° C.) dispersion of 144 g. (2.6 moles) of potassium hydroxide in 430 ml. of toluene, 32 ml. of n-butanol and 40 ml. of dimethyl formamide, was added, over one hour, 137.4 g. (0.9 mole) of menthone, while continuously passing dry acetylene into the system. The reaction mixture was hydrolyzed by adding 500 ml. of ice water, the organic solvent layer was separated, neutralized with $CO_2$ and dried, and the solvent removed by distillation. The yield was 120 g. of 2-isopropyl-5-methyl-1-ethynyl cyclohexanol, boiling at 105–107° C. at 10 mm. (75% of theory), $n_D^{20}$ 1.4718.

Example 6

A dispersion was prepared as set forth in Example 1 from 144 g. (2.6 moles) of potassium hydroxide in 430 ml. of toluene, 32 ml. of n-butanol and 40 ml. of dimethyl formamide. The dispersion was chilled to +10° C. and saturated with acetylene. While continuously bubbling acetylene in the reaction mixture 120 g. (0.9 mole) of p-tolylaldehyde was added over one hour. The reaction mixture was hydrolyzed by adding 500 ml. of ice water and the upper layer of organic solvents separated, neutralized with $CO_2$ and dried. The solvents were removed by distillation. The residue, ethynyl-p-tolyl carbinol, boiled at 109–110° C. at 5 mm. (yield 65% of theory), $n_D^{21}$ 1.5441.

Example 7

A reaction medium was prepared as set forth in Example 1 from 144 g. (2.6 moles) of potassium hydroxide in 430 ml. of toluene, 32 ml. of n-butanol and 40 ml. of dimethyl formamide. This was chilled to 0° C. and saturated with acetylene. To it over a one hour period was added 150 g. (1 mole) of piperonal, while continuously bubbling acetylene into the reaction mixture. The stirring and bubbling of acetylene was continued an additional fifteen minutes. After all of the piperonal had been added, the potassium metallo-organic complex was hydrolyzed by addition of 500 ml. of ice water, and the upper layer of organic solvent containing the reaction product was separated, neutralized with $CO_2$, and dried. The solvents were distilled. The residue came over at 123–125° C. at 0.5 mm. $n_D^{21}$ 1.5703.

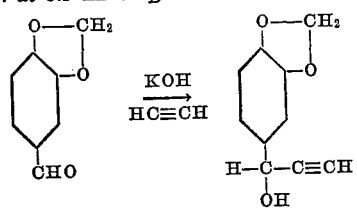

Example 8

A mixture of 558 ml. of dry toluene, 42 ml. of n-butyl alcohol and 187 g. (3.3 moles) potassium hydroxide was refluxed and stirred as in Example 1. After the suspension cooled, 50 ml. of redistilled formamide was added. The mixture was then chilled to −10° C., while dried acetylene was passed in. To this was added 163 g. of methyl hexyl ketone while continuously chilling, agitating and passing in acetylene. The addition was completed in one hour, and stirring continued for an additional fifteen minutes. The acetylenic alcohol was isolated as in Example 3, and 104 g. were distilled at 96–98° C. at 20 mm., $n_D^{20}$ 1.4409.

Example 9

A mixture of 144 g. of potassium hydroxide (2.6 moles), 430 ml. dry toluene and 32 ml. of redistilled n-butanol was heated to 100° C. without stirring. Agitation was then started and the materials were refluxed with vigorous agitation for one-half hour. The solution was chilled to −10° C. and 40 ml. of dimethyl acetamide was added. The system was saturated with dry acetylene, and the gas was bubbled in continuously while 74.2 g. (0.65 mole) of methyl amyl ketone was added over at one hour period. The flow of gas and agitation were continued for another fifteen minutes. The reaction was quenched by the rapid addition of 500 ml. of ice water. The organic solvent upper layer was separated, treated with carbon dioxide and dried. The solvent was removed by distillation, after which the methyl actynol was distilled at 102–106° C. at 44 mm. 55 g. were obtained, $n_D^{20}$ 1.4392

We claim:

1. In the synthesis of acetylinic alcohols by the process which comprises reacting a mixture consisting essentially of potassium hydroxide, a small proportion of a monohydric alcohol containing from three to eleven carbon atoms, an organic liquid and an organic carbonyl compound with a 1-alkyne having a hydrogen atom in the 1- position to effect reaction between the alkyne, carbonyl compound and potassium hydroxide to produce the potassium derivative of the corresponding acetylenic alcohol, hydrolyzing the potassium derivative with water to produce the acetylenic alcohol, and separating the latter, the improvement which comprises conducting the reaction in the presence of an aliphatic amide having the formula $RCONR_1R_2$ wherein R, $R_1$ and $R_2$ are selected from the group consisting of hydrogen and lower alkyl radicals having from one to about five carbon atoms.

2. A process in accordance with claim 1 in which the amide is dimethyl formamide.

3. A process in accordance with claim 1 in which the amide is formamide.

4. A process in accordance with claim 1 in which the amide is dimethyl acetamide.

5. A process in accordance with claim 1 in which the amount of amide is within the range from 0.5 to 25%.

References Cited in the file of this patent

UNITED STATES PATENTS 2,487,007  Walker et al. _____ Nov. 1, 1949